Patented Jan. 9, 1940

2,186,516

UNITED STATES PATENT OFFICE 2,186,516

METHOD OF PREPARING OF PROGRESSIVE-BURNING SMOKELESS POWDER AND PRODUCT THEREOF

Floyd L. Boddicker, Ishpeming, Mich., assignor to Hercules Powder Company, Wilmington, Del., a corporation of Delaware No Drawing. Application October 13, 1936, Serial No. 105,361

14 Claims. (Cl. 52—5)

This invention relates to an improved method of preparation of progressive-burning smokeless powder more particularly to an improved method of coating smokeless powder with a deterrent material, and to smokeless powder coated with a water-soluble deterrent material.

As is well known, in order to render possible close control of the burning rate of smokeless powder and produce a high velocity of the projectile without high breech pressures, it has been customary to coat the grains of the smokeless powder with a deterrent material, explosive or non-explosive, which will retard the burning rate of the powder grains. Such coating material desirably penetrates the powder grains more or less, so that as the powder burns, the successively exposed surfaces contain gradually less and less of the deterrent material, thus causing the combustion of the grains to proceed with increasing speed.

In order to effect the coating of the powder grains with the deterrent material and to obtain the desired degree of penetration of such material, numerous processes have been devised, e. g., using dinitrotoluene as the deterrent material, powder grains coated with dinitrotoluene are subjected to heat, with or without the presence of moisture or water. By another method, the powder grains are coated by treatment with a solution of dinitrotoluene in benzene, the benzene evaporated, and penetration of the dinitrotoluene obtained by immersing the coated powder grains in a hot water bath for several hours or several days. By still another method, using as the deterrent material a mixture of dimethyldiphenylurea and dinitrotoluene, or dimethyldiphenylurea alone, the powder grains and deterrent material are covered with water, and after mixing, heat is applied for varying periods.

Treatment of smokeless powder grains to render their combustion progressive, by methods heretofore known, while productive of desired results to a degree, has been open to a number of objections. For example, the use of a deterrent and powder grains alone requires long-continued heat and tumbling to obtain uniform distribution of deterrent on the powder grains, and may lead to explosions. The use of water with the deterrent and powder grains requires long treatment and renders uniform coating difficult on account of the water-insolubility of all deterrents heretofore known. The use of a deterrent solvent, e. g., benzol, is open to the great risk of explosion of solvent vapors, their posionous nature, and the economic necessity of recovery of the solvent.

Now in accordance with my invention I may utilize as a deterrent a water-soluble substance and subject the powder grains and water solution of the deterrent to various temperatures for various times, to effect a uniform coating of the powder grains with the deterrent. I may use only sufficient of the aqueous solution of the deterrent to moisten the grains, or I may use an excess of the aqueous deterrent solution and then remove such excess, in both cases finally drying the powder grains to remove the moisture therefrom.

In accordance with my invention I may utilize as water-soluble deterrents methyl cellosolve adipate, thiodiglycol, thiodigylcol acetate, glycerol diacetate, or other water-soluble smokeless powder deterrent. Instead of glycerol diacetate I may use diacetin which, as available commercially, may contain the mono- and triacetates of glycerol in varying amounts.

As an example of the carrying out of the process involving my invention, utilizing, for example, glycerol diacetate as the deterrent substance, two parts by weight of a 15% nitroglycerin, flake powder suitable for use in .22 caliber rim fire cartridges, was wet with 10% by weight of water, and 2.5 parts by weight of glycerol diacetate added. The whole was then placed in a Sweetie barrel, and run therein at 35° C. for 15 minutes, then at 55° C. for 15 minutes, the mass removed from the Sweetie barrel and dried for 40 hours at 55° C.

As a further illustration of the carrying out of the process embodying my invention, one part by weight of a 20% nitroglycerin rifle powder, suitable for use in large volume, center-fire rifle cartridges, was treated with a solution of 160 parts by weight of a 3.5% solution of methyl cellosolve adipate, first in the cold, then warmed up slowly to 90° C., maintained at 90° C. for 1 hour, removed from the Sweetie barrel and dried for 3 days at 55° C.

Similarly, I may treat single base smokeless powders to render them progressive burning by coating with a water-soluble deterrent.

By virtue of my invention, not only are the powder grains uniformly coated and penetrated by the water-soluble deterrent, but the desired result is obtained without the attendant risk of overheating and explosion attending dry heating of powder grains and deterrent, and without the hazard of vapor poisoning and solvent recovery attending deterrent solution in volatile hydrocarbons.

A further and highly advantageous result of my invention is that it enables the coating of double base smokeless powders with deterrent, without such injury to the powder as results from any attempt to coat such powders by processes involving water and water-insoluble deterrent alone, because the prolonged treatment of the powder grains by the hot water dissolves an appreciable quantity of nitroglycerin from the powder grains. By virtue of my invention, however, double base smokeless powder can be coated with deterrent, because the time of treatment and the quantity of water used are so small that no appreciable amount of nitroglycerin is removed, particularly when only sufficient of the aqueous deterrent solution is used to moisten the grains of powder.

What I claim and desire to protect by Letters Patent is:

1. The method of coating smokeless powder grains with a deterrent which includes the step of surface coating of smokeless powder grains with a water-soluble deterrent substance.

2. The method of coating smokeless powder with a deterrent which includes treating smokeless powder with only sufficient of an aqueous solution of a deterrent substance to moisten the grains.

3. The method of coating smokeless powder grains with a deterrent which includes adding water to smokeless powder grains, adding a water-soluble deterrent to the mixture of smokeless powder grains and water, heating and agitating said mixture of smokeless powder, water and deterrent, and drying the coated smokeless powder grains.

4. Progressive burning smokeless powder comprising smokeless powder grains surface coated with a water-soluble deterrent material.

5. The method of coating smokeless powder grains with a deterrent which includes the step of surface coating of smokeless powder grains with a water-soluble, deterrent substance from the group consisting of diacetin, methyl cellosolve adipate, thiodiglycol, thiodiglycol diacetate and glycerol diacetate.

6. The method of coating smokeless powder grains with a deterrent material which includes the step of surface coating smokeless powder grains with glycerol diacetate which is dissolved in an aqueous solution which is substantially free from other organic solvents.

7. The method of coating smokeless powder grains with a deterent material which includes the step of surface coating smokeless powder grains with thiodiglycol which is dissolved in an aqueous solution which is substantially free from other organic solvents.

8. The method of coating smokeless powder grains with a deterrent material which includes the step of surface coating smokeless powder grains with methyl cellosolve adipate which is dissolved in an aqueous solution which is substantially free from other organic solvents.

9. Progressive burning smokeless powder comprising smokeless powder grains surface coated with a water-soluble deterent substance from the group consisting of diacetin, methyl cellosolve adipate, thiodiglycol, thiodiglycol diacetate and glycerol diacetate.

10. Progressive burning smokeless powder comprising smokeless powder grains surface coated with glycerol diacetate.

11. Progressive burning smokeless powder comprising smokeless powder grains surface coated with thiodiglycol.

12. Progressive burning smokeless powder comprising smokeless powder grains surface coated with methyl cellosolve adipate.

13. The method of coating smokeless powder grains with a deterrent which includes treating smokeless powder grains with an excess of an aqueous solution of an organic deterrent substance, and removing said excess solution from the smokeless powder grains, said deterrent substance being dissolved in said aqueous solution which is substantially free from other organic solvents.

14. The method of coating smokeless powder grains with a deterrent which includes the step of surface coating smokeless powder grains with an organic deterrent substance which is dissolved in an aqueous solution which is substantially free from other organic solvents.

FLOYD L. BODDICKER.